United States Patent [19]
Nowicki

[11] 3,719,297
[45] March 6, 1973

[54] VEHICLE ROOF SKI RACK

[75] Inventor: Ronald J. Nowicki, Sterling Heights, Mich.

[73] Assignee: General Motors Corporation, Detroit, Mich.

[22] Filed: Nov. 27, 1970

[21] Appl. No.: 93,233

[52] U.S. Cl. ............................214/450, 224/42.1 F
[51] Int. Cl. .................................................B60r 9/00
[58] Field of Search ........224/42.1 F, 42.1 D, 42.1 E, 224/42.1 G, 42.1 H; 214/450, 42.44

[56] References Cited

UNITED STATES PATENTS

| | | | |
|---|---|---|---|
| 3,132,755 | 5/1964 | Greenslate | 214/450 |
| 3,294,267 | 12/1966 | Schweigert | 224/42.44 |
| 3,503,547 | 3/1970 | Shields | 224/42.1 E |
| 2,746,628 | 5/1956 | Neyra | 224/42.1 F |
| 3,223,302 | 12/1965 | Helm | 224/42.1 F |

*Primary Examiner*—Gerald M. Forlenza
*Assistant Examiner*—John Mannix
*Attorney*—W. E. Finken and Herbert Furman

[57] ABSTRACT

A vehicle roof ski rack includes front and rear ski clamp assemblies mounted on a vehicle roof for lateral outboard movement from a storage position, generally above the roof, to a loading position allowing convenient access to the clamp assemblies. The clamp assemblies include respective clamp members that are spring biased toward unclamped positions and pivotally movable to ski clamping positions in which first latch members respectively secure the clamp members. Second latch members respectively hold the clamp assemblies in the storage position and a key releasably controlled actuating member, that extends longitudinally between the clamp assemblies, is rotatably actuated to move the first and second latch members to respective unlatched positions to simultaneously allow movement of the clamp members to the unclamped positions and movement of the clamp assemblies to the loading position.

2 Claims, 8 Drawing Figures

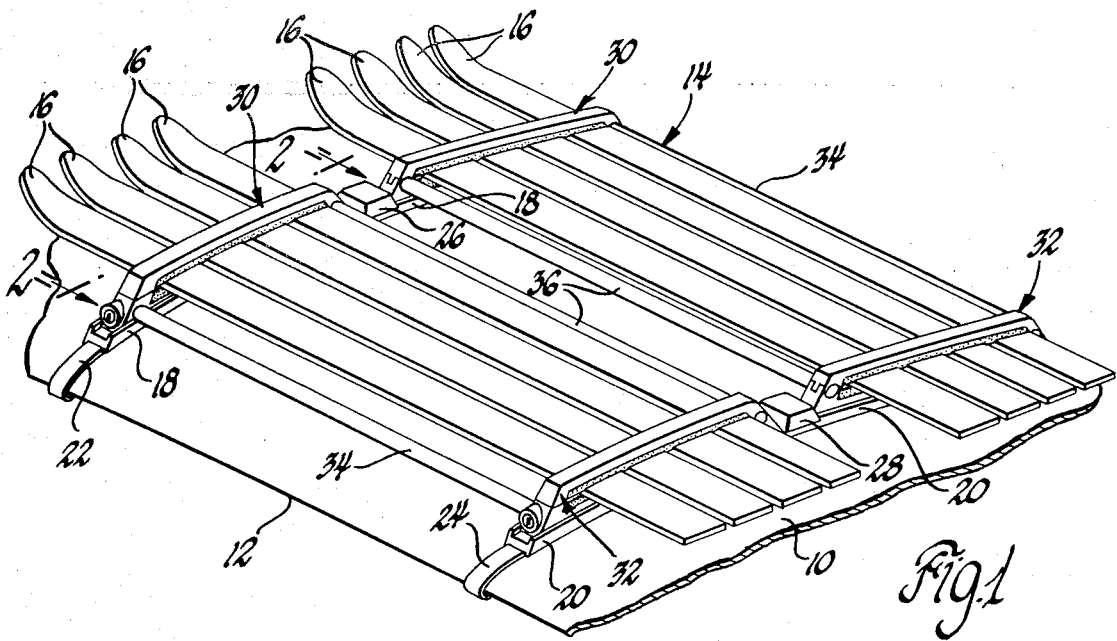
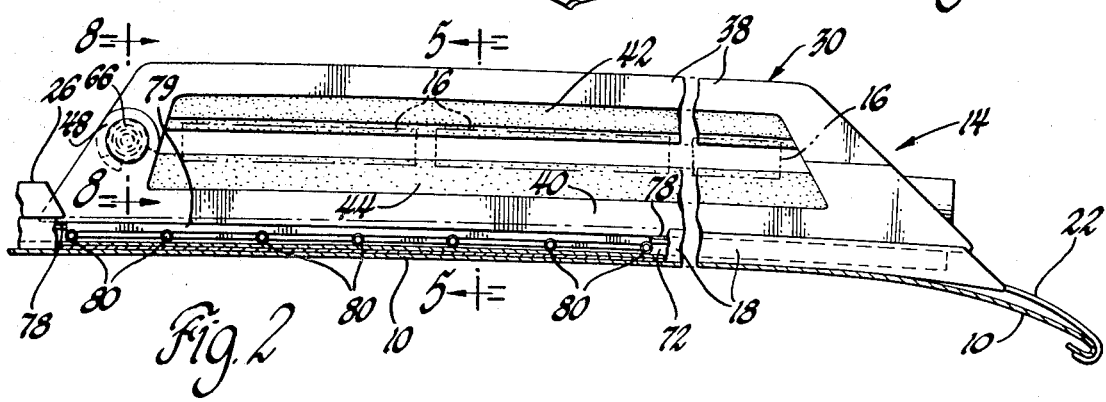
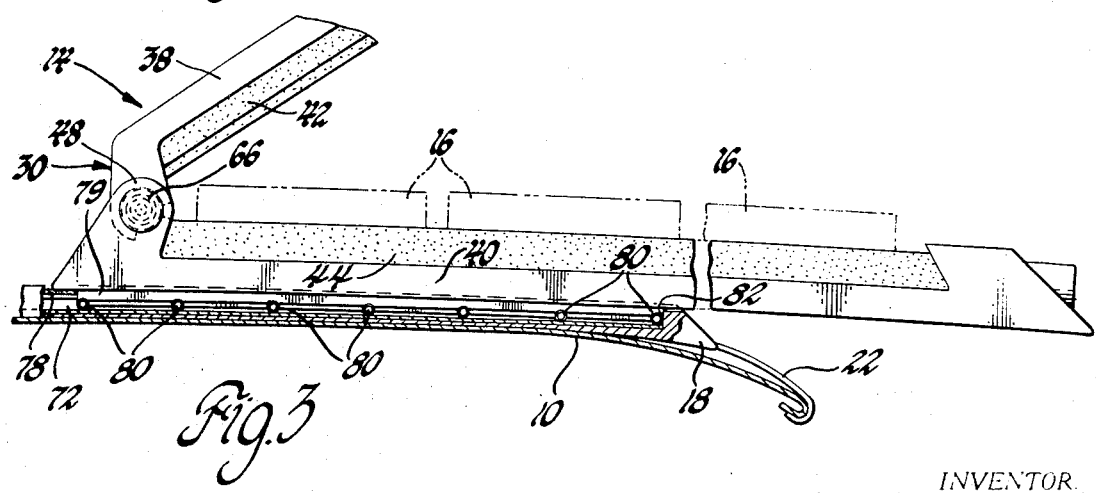
INVENTOR
Ronald J. Nowicki
BY
Herbert Furman
ATTORNEY

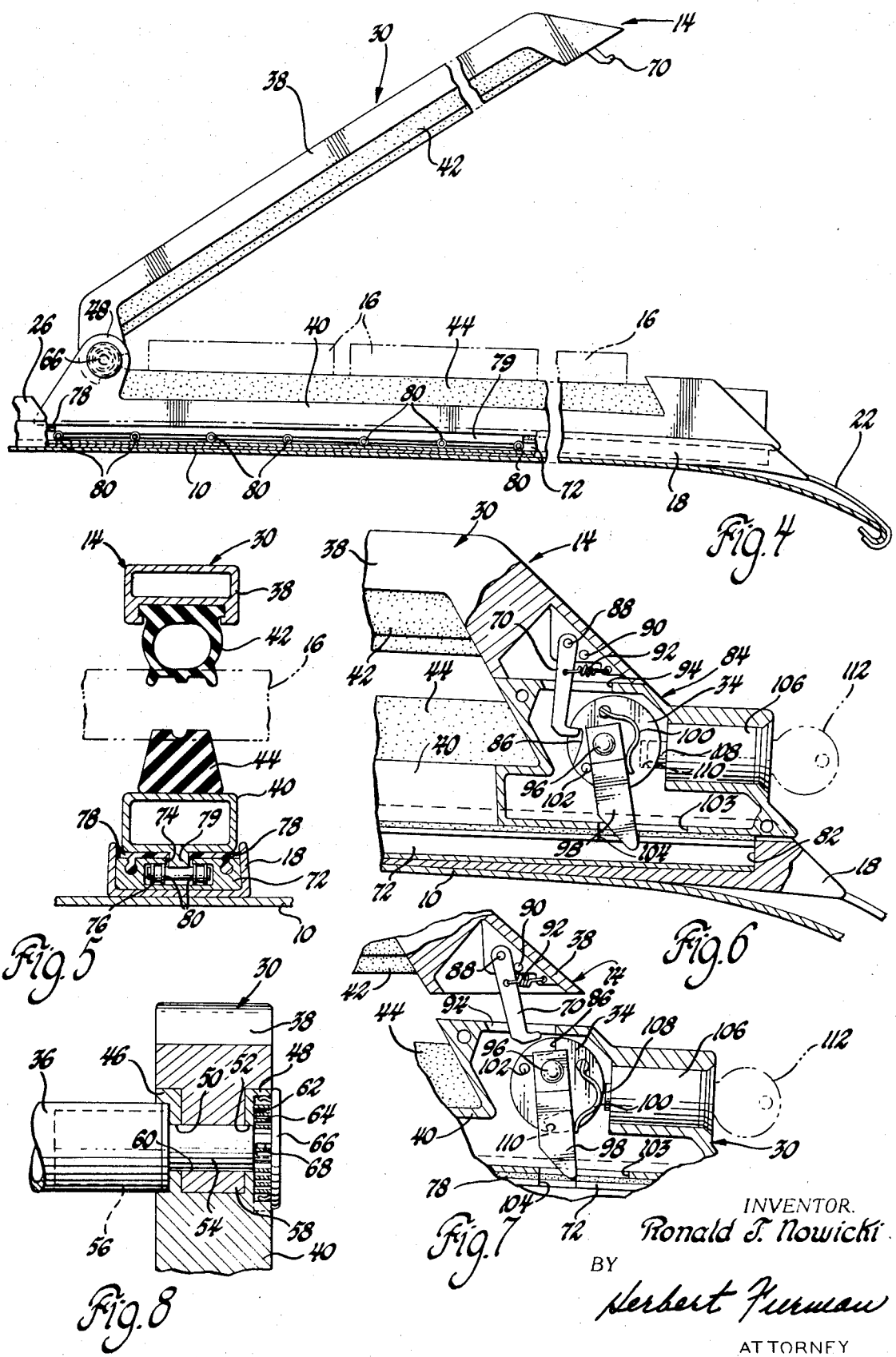

VEHICLE ROOF SKI RACK

This invention relates to a vehicle roof ski rack that includes clamp assemblies that are mounted on a vehicle roof for lateral outboard movement from a storage position, generally above the roof, to a loading position allowing convenient access to the clamp assemblies.

Vehicle roof ski racks conventionally include front and rear clamp assemblies which clamp skis and thereby mount the skis generally above the vehicle roofs extending longitudinally thereof. Presently, there is a trend toward using vehicle roofs that are narrower than previous vehicle roofs; nevertheless, the widths of vehicle bodies remain substantially unchanged. This trend necessarily makes it increasingly difficult for the persons loading or unloading the skis to reach the clamp assemblies without leaning over the sides of the vehicle bodies and possibly soiling clothing.

By providing clamp assemblies mounted on a vehicle roof for lateral outboard movement from a storage position to a loading position, this invention allows a person to load or unload the skis without leaning over the side of the vehicle body.

One feature of this invention is that it provides an improved vehicle roof ski rack that includes clamp assemblies mounted for lateral outboard movement from a storage position, generally above the vehicle roof, to a loading position that allows convenient access to the clamp assemblies.

Another feature of this invention is that the clamp assemblies include respective clamp members biased toward unclamped positions and held in ski clamping positions by first latch members.

Yet another feature of this invention is that second latch members respectively hold the clamp assemblies in the storage position and an actuating member simultaneously moves the first and second latch members to respective unlatched positions to thus simultaneously unclamp the skis and allow movement of the clamp assemblies to the loading position.

Still another feature of this invention is that the actuating member is key releasably controlled and extends longitudinally of the roof between the clamp assemblies to coordinate the lateral movement of the clamp assemblies.

These and other features of this invention will be apparent from the following specification and drawings in which:

FIG. 1 is a perspective view of a portion of a vehicle roof that supports a ski rack, according to the invention, with the clamp assemblies shown in the storage position and with the clamp members in ski clamping positions mounting a plurality of skis on the roof with their tips facing forwardly;

FIG. 2 is an enlarged partially broken away sectional view of the front left-hand clamp assembly taken along line 2—2 of FIG. 1 and showing the skis by phantom lines;

FIG. 3 is a view similar to FIG. 2 but with the clamp member in the unclamped position and the clamp assembly in the loading position;

FIG. 4 is similar to FIG. 3 but with the clamp assembly in the storage position;

FIG. 5 is an enlarged sectional view taken along line 5—5 of FIG. 2;

FIG. 6 is an enlarged partially broken away view of a portion of FIG. 2 that shows first and second latch members that respectively hold the clamp member in ski clamping position and the clamp assembly in storage position;

FIG. 7 is a view of a portion of FIG. 6 but with the latch members shown in unlatched positions and the clamp member moved slightly toward unclamped position; and FIG. 8 is an enlarged sectional view taken generally along line 8—8 of FIG. 2.

Referring to FIG. 1, a vehicle roof 10 includes lateral edges 12 and supports a ski rack 14 that mounts a plurality of skis 16 whose tips face forwardly of roof 10. Ski rack 14 includes left and right-hand front mounting members 18 and left and right-hand rear mounting members 20. At their outboard ends, mounting members 18 and 20 are secured to edges 12 by respective hooked portions 22 and 24. At their inboard ends, the left-hand mounting members 18 and 20 are respectively secured to their symmetrical right-hand counterparts by conventional front and rear lateral adjustment means that are respectively covered by front and rear caps 26 and 28 and which allow the ski rack 14 to be securely mounted on vehicle roofs having various widths. As will be more fully hereinafter described, mounting members 18 and 20 respectively support front and rear clamp assemblies 30 and 32 such that a rotational actuation of left or right-hand actuating members 34 respectively allows lateral outboard movement of the left or right-hand clamp assemblies 30 and 32 from the storage position, as shown, to a loading position that allows convenient access to the respective clamp assemblies 30 and 32. Left and right-hand hinge members 36 extend longitudinally between the front and rear clamp assemblies 30 and 32, parallel with actuating members 34, and function in a manner to be hereinafter described.

The operation of ski rack 14 will be more fully described by a more detailed description of the front left-hand clamp assembly 30. Except as will be noted, it will be understood that the rear left-hand clamp assembly 32 is symmetrical to the front left-hand clamp assembly and that the front and rear right-hand clamp assemblies 30 and 32 are symmetrical to their left-hand counterparts.

Referring to FIG. 2, clamp assembly 30 includes upper and lower clamp members 38 and 40 to which are conventionally adhesively bonded respective rubber strips 42 and 44 thus providing resilient clamping of skis 16. As seen in FIG. 8, member 40 includes laterally spaced upwardly extending legs 46 and 48 with respective apertures 50 and 52 receiving a pin 54 that extends from an insert 56 suitably mounted within the end of hinge member 36. Clamp member 38 includes a downwardly extending leg 58 that is received between legs 46 and 48 and has an aperture 60 receiving pin 54. A suitable key, not shown, fixes leg 58 of clamp member 38 to pin 54 such that pivoting movement of clamp member 38 between a ski clamping position, FIG. 2, and an unclamped position, FIGS. 3 and 4, also rotates hinge member 36 which thus coordinates the movement of clamp member 38 with the upper clamp member of the rear left-hand clamp assembly 32. Leg 48 includes a generally flattened aperture 62 that receives a spiral spring 64 covered by a suitable cap 66. The outer end of spring 64 is suitably fixed with respect to clamp member 40 while the inner end is received within a slot 68 in the end of pin 54 such that spring 64 biases clamp member 38 to the unclamped position, FIGS. 3 and 4. A first latch member 70 holds clamp member 38 in the ski clamping position as will be more fully hereinafter described.

As seen in FIG. 5, mounting member 18 has a generally channel shaped cross-section and receives an elongated guide member 72 held in position by the inward tapering of the side walls of member 18. Guide member 72 includes a longitudinally extending slot 74 that opens to a longitudinally extending cavity 76 of rectangular cross-section. Clamp member 40 is supported on guide member 72 by suitable slide plates 78 and includes an integral downwardly extending longitudinal rib 79 that extends through aperture 74 to rotatably mount a number of pairs of spaced rollers 80, FIGS. 2 through 5. The rollers 80 engage the upper wall of cavity 76 and thus mount clamp assembly 30 for lateral outboard movement from the storage position to the loading position in which the outboard roller 80 engages the outboard end wall 82 of cavity 76, as in FIG. 3. This engagement prevents further outboard movement of clamp assembly 30 and locates clamp assembly 30 in the FIG. 3 loading position readily accessible to a person loading or unloading skis 16 on ski rack 14.

Referring to FIG. 6, the outboard end of clamp member 40 includes a latch housing generally indicated by 84. Actuating member 34 extends through a suitable aperture in the rear side of housing 84 and includes a keeper slot 86. Latch member 70 is pivoted to clamp member 38 by a pin 88 and normally biased into engagement with a stop 90 by a spring 92. With the actuating member 34 in the FIG. 6 unactuated position, movement of the clamp member 38 to the ski clamping position causes the lower end of latch member 70 to move through an upper aperture 94 in latch housing 84 and to be received within keeper slot 86 thus preventing subsequent movement of clamp member 38 to the unclamped position prior to actuation of actuating member 34. A pin 96 eccentrically pivots a second latch member 98 to the end of actuating member 34 and a leaf spring 100 mounted on the end of actuating member 34 biases latch member 98 into engagement with a pin 102. In the latched position of FIG. 6, latch member 98 extends downwardly through a lower aperture 103 in housing 84 and is received within a keeper aperture 104 in guide member 72 to prevent lateral outboard movement of clamp assembly 30. A lock cylinder 106 includes a plunger 108 normally biased outwardly such that it is received within a slot 110 in actuating member 34 to thus maintain actuating member 34 in the unactuated position. It should be noted that the rear left-hand clamp assembly 32 does not include such a lock cylinder, however, it does include a suitable torsion spring within its latch housing and the torsion spring biases actuating member 34 counterclockwise to the unactuated position where movement of the plunger 108 within slot 110 locates actuating member 34.

With the clamp assemblies 30 and 32 in the storage position, lateral outboard movement of the clamp assemblies to perform either a loading or unloading operation is accomplished as follows. A phantom line indicated key 112 is inserted within lock cylinder 106 and rotated to retract plunger 108 from slot 110 in actuating member 34. Actuating member 34 is then rotated clockwise, as in FIG. 6, to the FIG. 7 actuated position where latch member 70 is free of keeper slot 86 and where latch member 98 has moved upwardly out of aperture 104 in guide member 72. This movement allows the spring bias of clamp assemblies 30 and 32 to move the respective upper clamp members to respective unclamped positions, as in FIG. 4. A subsequent lateral outboard force on actuating member 34 then moves the clamp assemblies 30 and 32 outboard to the FIG. 3 loading position in which the loading or unloading operation is performed. The upper clamp members are then moved back to their ski clamping positions and the respective first latch members move into the respective keeper slots in the actuating member 34. This movement prevents subsequent movement of the upper clamp members to the unclamped positions prior to a subsequent actuation of actuating member 34. An inboard force is then applied to actuating member 34 to move the clamp assemblies 30 and 32 inboard to the storage position above the roof 10. This causes latch member 98 to pivot counterclockwise about pin 96 against the bias of spring 100 as the end of latch member 98 slides along one of the slide plates 78. When the clamp assemblies are moved sufficiently inboard, latch member 98 is received within aperture 104 in guide member 72, and thus prevents subsequent outboard movement of the clamp assemblies 30 and 32. Since the clamp assemblies must move somewhat inboard of the FIG. 6 position for latch member 98 to pivot within aperture 104, suitable springs, not shown, engage the inboard ends of the clamp assemblies during this movement and subsequently apply a lateral outboard force to prevent subsequent inboard movement of the clamp assemblies.

The invention thus provides an improved vehicle roof ski rack.

What is claimed is:

1. A vehicle roof ski rack comprising, front and rear guide means, roof mounting means for mounting the front and rear guide means on a vehicle roof in laterally spaced relationship longitudinally of the roof, front and rear ski clamp assemblies including respective clamp members pivotally mounted for movement between unclamped positions and ski clamping positions, first latch means for holding the clamp members in the ski clamping positions, unlatching of the first latch means allowing movement of the clamp members to the unclamped positions, the front and rear clamp assemblies being respectively mounted on the front and rear guide means for movement laterally of the roof from a first position within the confines of the roof to a second position laterally outboard of the roof from the first position, second latch means for holding the clamp assemblies in the first position, unlatching of the second latch means allowing the clamp assemblies to move to the second position, and actuating means for simultaneous unlatching of the first and second latch means.

2. A vehicle roof ski rack comprising, front and rear guide means, roof mounting means for mounting the front and rear guide means on a vehicle roof in laterally spaced relationship longitudinally of the roof, front and rear ski clamp assemblies including respective clamp members pivotally mounted for movement between unclamped positions and ski clamping positions, spring means biasing the clamp members toward the unclamped positions, first latch means for holding the clamp members in the ski clamping positions, unlatching of the first latch means allowing the spring means to move the clamp members to the unclamped positions, the front and rear clamp assemblies being respectively mounted on the front and rear guide means for movement laterally of the roof from a first position within the confines of the roof to a second position laterally outboard of the roof from the first position, second latch means for holding the clamp assemblies in the first position, unlatching of the second latch means allowing the clamp assemblies to move to the second position, and key releasable actuating means for simultaneous unlatching of the first and second latch means.

* * * * *